United States Patent
Bruno et al.

(10) Patent No.: US 9,840,333 B2
(45) Date of Patent: Dec. 12, 2017

(54) ENVIRONMENTAL CONTROL SYSTEM MIXING CABIN DISCHARGE AIR WITH BLEED AIR DURING A CYCLE

(71) Applicant: Hamilton Sundstrand Corporation, Windsor Locks, CT (US)

(72) Inventors: Louis J. Bruno, Ellington, CT (US); Paul M. D'Orlando, Simsbury, CT (US); Donald E. Army, Jr., Enfield, CT (US); Thomas M. Zywiak, Suffield, CT (US); Harold W. Hipsky, Willington, CT (US); Erin G. Kline, Vernon, CT (US); Richard Rusich, Ellington, CT (US); John M. Maljanian, Jr., Farmington, CT (US); Eric Surawski, Wethersfield, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 137 days.

(21) Appl. No.: 14/695,543

(22) Filed: Apr. 24, 2015

(65) Prior Publication Data

US 2016/0311539 A1  Oct. 27, 2016

(51) Int. Cl.
*B64D 13/06* (2006.01)

(52) U.S. Cl.
CPC ...... *B64D 13/06* (2013.01); *B64D 2013/0618* (2013.01); *B64D 2013/0648* (2013.01); *B64D 2013/0688* (2013.01); *Y02T 50/56* (2013.01)

(58) Field of Classification Search
CPC ............ B64D 13/06; B64D 2013/0688; B64D 2013/0648; B64D 2013/0618; B64D 2013/0611; B64D 2013/0614; B64D 2013/02; F02C 6/08; Y02T 50/56; Y02T 50/80
USPC .................................................... 62/401, 402
See application file for complete search history.

(56) References Cited

U.S. PATENT DOCUMENTS

| | | | |
|---|---|---|---|
| 3,877,246 A | 4/1975 | Schutze | |
| 4,262,495 A | 4/1981 | Gupta et al. | |
| 4,312,191 A * | 1/1982 | Biagini | B64D 13/06 62/172 |
| 5,511,385 A * | 4/1996 | Drew | B64D 13/06 62/172 |
| 5,887,445 A * | 3/1999 | Murry | B64D 13/06 62/402 |
| 5,967,461 A * | 10/1999 | Farrington | B64D 13/06 244/118.5 |

(Continued)

OTHER PUBLICATIONS

EPSR for EP Application No. 16166826.4, dated Aug. 22, 2016, 10 pages.

*Primary Examiner* — Mohammad M Ali
(74) *Attorney, Agent, or Firm* — Cantor Colburn LLP

(57) ABSTRACT

A system and method that comprises an air cycle machine, a flow of bleed air, at least one heat exchanger, and an inlet configured to supply the flow of the bleed air is provided. The bleed air directly flows from a source to mix with recirculated air downstream of a compressor of the air cycle machine in accordance with a high pressure mode or a recirculation chilling mode. The system and method can also utilize the recirculated air flowing from the chamber to drive or maintain the air cycle machine in accordance with the above modes.

11 Claims, 5 Drawing Sheets

(56) References Cited

U.S. PATENT DOCUMENTS

| | | | |
|---|---|---|---|
| 2007/0266695 A1* | 11/2007 | Lui | B64D 13/06 60/204 |
| 2008/0022688 A1* | 1/2008 | Decrisantis | B64D 13/06 60/751 |
| 2008/0032616 A1* | 2/2008 | Vogel | B64D 13/06 454/74 |
| 2009/0117840 A1* | 5/2009 | Kresser | B64D 13/06 454/71 |
| 2010/0064701 A1* | 3/2010 | Bruno | B64D 13/06 62/90 |
| 2010/0176245 A1* | 7/2010 | Isella | B64D 37/32 244/135 R |
| 2012/0000205 A1* | 1/2012 | Coffinberry | B64D 13/06 60/806 |
| 2012/0285184 A1* | 11/2012 | Voinov | B64D 13/06 62/87 |
| 2013/0152615 A1* | 6/2013 | Lee | H05K 7/207 62/241 |

* cited by examiner

ENVIRONMENTAL CONTROL SYSTEM MIXING CABIN DISCHARGE AIR WITH BLEED AIR DURING A CYCLE

BACKGROUND OF THE INVENTION

In general, there is an overarching trend in the aerospace industry towards more efficient systems within an aircraft. With respect to present air conditioning systems of the aircraft, efficiency can be derived from utilizing proper engine bleed pressures based on environmental condition surroundings the aircraft.

For example, pressurized air from an engine of the aircraft is provided to a cabin through a series of systems that alters the temperature, humidity, and pressure of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

BRIEF DESCRIPTION OF THE INVENTION

According to one embodiment, an environmental control system, comprises a compressor outlet matched to a bleed air source; and a recirculated air that flows directly into a compressor comprising the compressor outlet, wherein the recirculated air discharged from the compressor outlet is at a same pressure as bleed air supplied by bleed air source, wherein the recirculated air discharged from the compressor outlet is combined with the bleed air supplied by the bleed air source to produce mixed air.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION OF THE INVENTION

A detailed description of one or more embodiments of the disclosed apparatus and method are presented herein by way of exemplification and not limitation with reference to the Figures.

As indicated above, the relatively high pressures provide limited efficiency with respect to engine fuel burn. Thus, what is needed is an environmental control system, which eliminates a primary heat exchanger and uses cabin discharge air to power the cycle at altitude, to provide cabin pressurization and cooling at high engine fuel burn efficiency.

In general, embodiments of the present invention disclosed herein may include a system and/or method (herein system) comprising an environmental control system, which excludes a heat exchanger between an engine and an air cycle machine to create the lowest pressure drop path possible. The environmental control system provides a new approach to cabin air conditioning that, for example, can operate at pressures as low as 2.5 psi below the cabin pressure.

Figure 1:
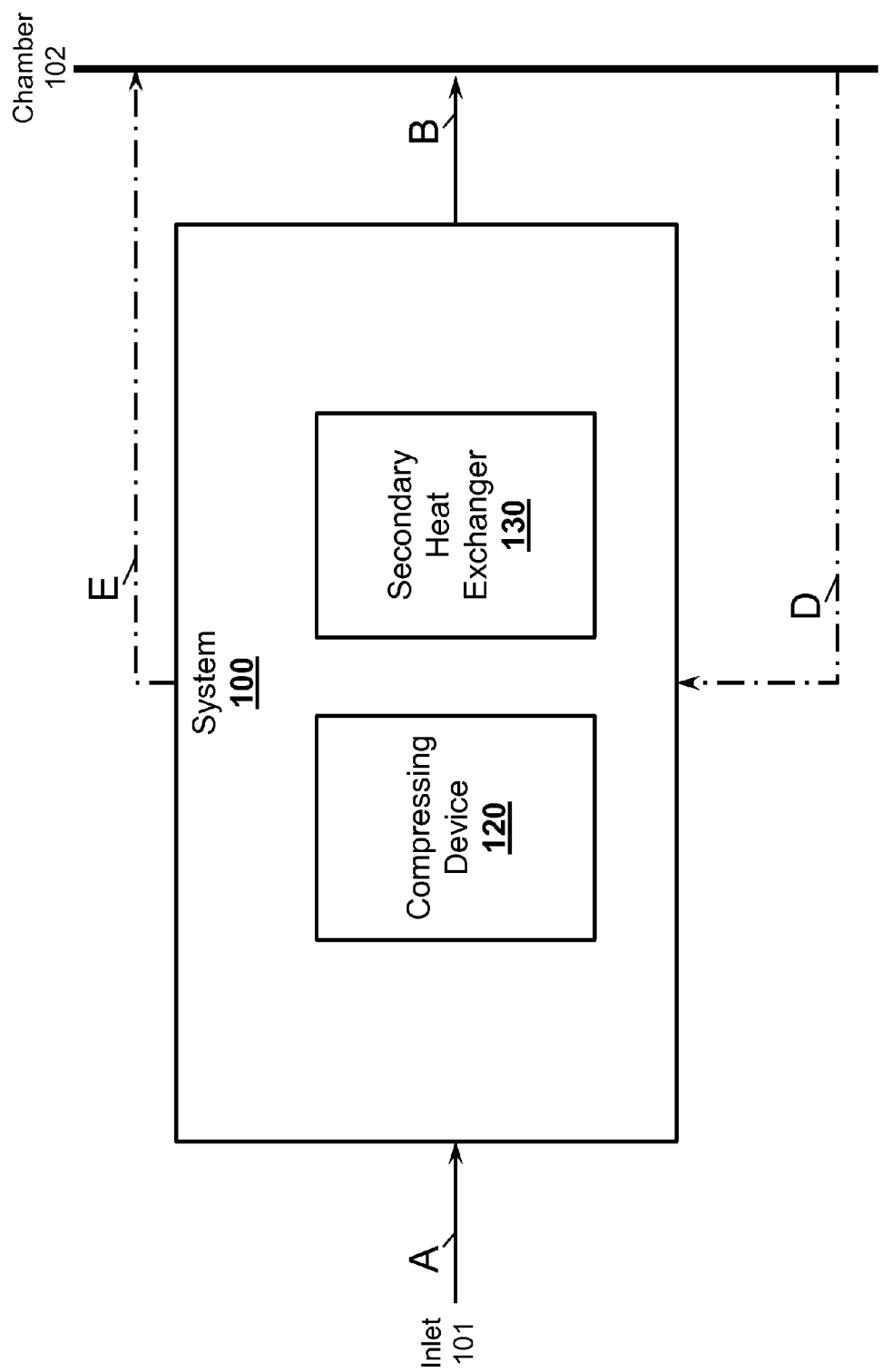
FIG. 1 depicts a schematic of a system according to an embodiment.

FIG. 1 illustrates a medium (e.g., air) flowing through a system 100 from an inlet 101 to a chamber 102, as indicated by solid-lined arrows A, B. In the system 100, the medium can flow from the inlet 101 to a compressing device 120, from the compressing device 120 to a secondary heat exchanger 130, and from the secondary heat exchanger 130 to the chamber 102. Further, the medium recirculates from chamber 102 through the system 100 and back to the chamber 102 (and/or external to the system 100), as indicated by the dot-dashed lined arrows D, E.

In one embodiment, the system 100 can be any environmental control system of a vehicle, such as an aircraft or watercraft, that provides air supply, thermal control, and cabin pressurization for a crew and passengers of the vehicle (e.g., a cabin air conditioning system of an aircraft). The system may also include avionics cooling, smoke detection, and fire suppression. For example, on an aircraft, air is supplied to the environmental control system by being "bled" from a compressor stage of a turbine engine. The temperature, humidity, and pressure of this "bleed air" varies widely depending upon a compressor stage and a revolutions per minute of the turbine engine. To achieve the desired temperature, the bleed-air is cooled as it is passed through at least one heat exchanger (e.g., exchanger 130). To achieve the desired pressure, the bleed-air is compressed as it is passed through a compressing device (e.g., compressing device 120). The interaction of the environmental control system with the engine influences how much fuel burn by the engine is needed to perform operations, such as supplying pressurized air, related to that interaction.

Heat exchangers (e.g., a secondary heat exchanger 130) are equipment built for efficient heat transfer from one medium to another. Examples of heat exchangers include double pipe, shell and tube, plate, plate and shell, adiabatic wheel, plate fin, pillow plate, and fluid heat exchangers. Continuing with the aircraft example above, air forced by a fan (e.g., via push or pull methods) is blown across the heat exchanger at a variable cooling airflow to control the final air temperature of the bleed-air.

The compressing device 120 (e.g., an air cycle machine as described below) is a mechanical device that controls/regulates a pressure of a medium (e.g., increasing the pressure of a gas). Examples of a compressor include centrifugal, diagonal or mixed-flow, axial-flow, reciprocating, ionic liquid piston, rotary screw, rotary vane, scroll, diaphragm, air bubble compressors. Further, compressors are typically driven by an electric motor or a steam or a gas turbine.

Note that the system 100 of FIG. 1 is in contrast to a conventional cabin air conditioning system that includes a traditional cabin three-wheel air conditioning system. In the conventional cabin air conditioning system, high pressure air from, for example, an engine passes through a in series a first ram air heat exchanger, an air cycle machine, a second ram air heat exchanger, and a high pressure water separator where the air is cooled and dehumidified, such that the resulting cold dry air is used to cool the cabin, flight deck, and other airplane systems. In operation, high-pressure high-temperature air from either then engine enters the first heat exchanger and is cooled by ram air. This warm high pressure air then enters the ACM compressor. The compressor further pressurizes the air and in the process heats it. The air then enters the second heat exchanger and is cooled by ram air to approximately ambient temperature. This cool high pressure air enters the high pressure water separator where the air goes through the reheater, where it is cooled; the condenser, where it is cooled by air from the ACM turbine; the water extractor, where the moisture in the air is removed; and the reheater, where the air is heated back to nearly the same temperature it started at when it entered the high pressure water separator. The warm high pressure and now dry air enters the turbine, where it is expanded and work extracted. The work from the turbine, drives both the before mentioned compressor and a fan that is used to pull ram air flow through the first and second heat exchangers. After leaving the turbine, the cold air, typically below freezing, cools the warm moist air in the condenser and is then sent to condition the cabin and flight deck.

Figure 2:
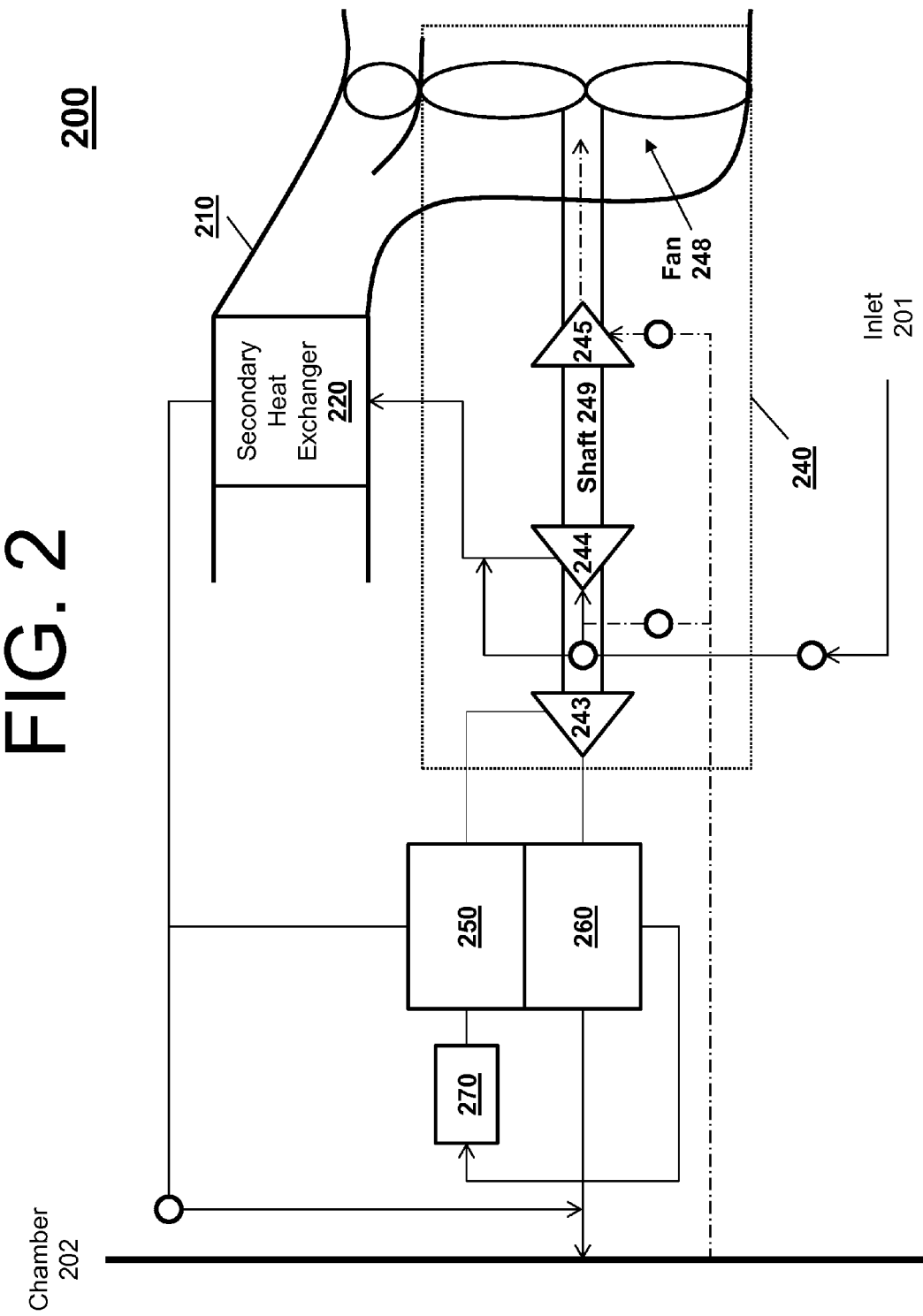
FIG. 2 depicts another schematic of a system according to an embodiment.

The system 100 of FIG. 1 will now be described with reference to FIGS. 2-5, in view of the aircraft example above. FIG. 2 depicts a schematic of a system 200 (e.g., an embodiment of system 100) as it could be installed on an aircraft. The system 200 illustrates bleed air flowing in at inlet 201 (e.g., off an engine of an aircraft at an initial flow rate, pressure, temperature, and humidity), which in turn is provided to a chamber 202 (e.g., cabin, flight deck, etc.) at a final flow rate, pressure, temperature, and humidity. Then the bleed air recirculates back through the system 200 from the chamber 202 (herein recirculated air and represented by the dot-dashed line) to drive the system 200. The system in includes a shell 210 for receiving and directing ram air through the system 200.

The system 200 further illustrates a secondary heat exchanger, 220, an air cycle machine 240 (that includes a turbine 243, a compressor 244, a turbine 245, a fan 248, and a shaft 249), a reheater 250, a condenser 260, and a water extractor 270, each of which is connected via tubes, pipes, and the like. Note that based on the embodiment, an exhaust from the system 200 can be sent to an outlet (e.g., releases to ambient air).

The system 200 is an example of an environmental control system of an aircraft that provides air supply, thermal control, and cabin pressurization for the crew and passengers of the aircraft. Valves are devices that regulate, direct, and/or control a flow of a medium (e.g., gases, liquids, fluidized solids, or slurries, such as bleed-air) by opening, closing, or partially obstructing various passageways within the tubes, pipes, etc. of the environmental control system 200. Valves can be operated by actuators, such that the flow rates of any medium in any portion of the environmental control system 200 may be regulated to a desired value. A secondary heat exchanger 220 is an example of a heat exchanger as described above.

The air cycle machine 240 (e.g., the compressing device 120), which includes a turbine 243, compressor 244, another turbine 245, a fan 248, and a shaft 249, controls/regulates a temperature, a humidity, and a pressure of a medium (e.g., increasing the pressure of a bleed air). The compressor 244 is a mechanical device that raises the pressure of the air received. The compressor 244 is configured to, whether during a low pressure mode (e.g., at altitude), a high pressure mode (e.g., on ground), recirculation chilling mode, or pressure boost mode, pressurize the recirculated air discharging from the chamber 202 to match or closely match a pressure of the bleed air. The turbines 243, 245 are mechanical devices that drive the compressor 244 and the fan 248 via the shaft 249. The fan 248 is a mechanical device that can force via push or pull methods air through the shell 210 across the secondary heat exchanger 220 at a variable cooling airflow. Thus, the turbines 243, 245, the compressor 244, and the fan 248 together illustrate, for example, that the air cycle machine 240 may operate as a four-wheel air cycle machine that utilizes air recirculated from the chamber 202.

The reheater 250 and the condenser 260 are particular types of heat exchanger. The water extractor 270 is a mechanical device that performs a process of taking water from any source, such as bleed-air, either temporarily or permanently. Together, reheater 250, the condenser 260, and/or the water extractor 270 can combine to be a high pressure water separator.

Note that in the environmental control system 200 of FIG. 2 there is no 'primary' heat exchanger. In this way, the environmental control system 200 shows a new approach to cabin air conditioning (e.g., chamber 202) that can operate at relatively low pressures compared to conventional systems (e.g., operate at 2.5 psi below a cabin pressure). That is, the environmental control system 200 eliminates the 'primary' heat exchanger and utilizes recirculated air from the chamber 202 (e.g., uses cabin discharge air) to power the air cycle machine 240 at altitude. In turn, when the environmental control system 200 is combined with a three port bleed system, the direct path between the engine and the air cycle machine creates a lowest pressure drop path possible.

The arrows of FIG. 2 illustrate all the possible paths that the bleed air and the recirculated air may flow through the environmental control system 200, as directed by the valves. Embodiments of depicting different combinations of flow paths will now be described with respect to FIGS. 3-5.

Figure 3:
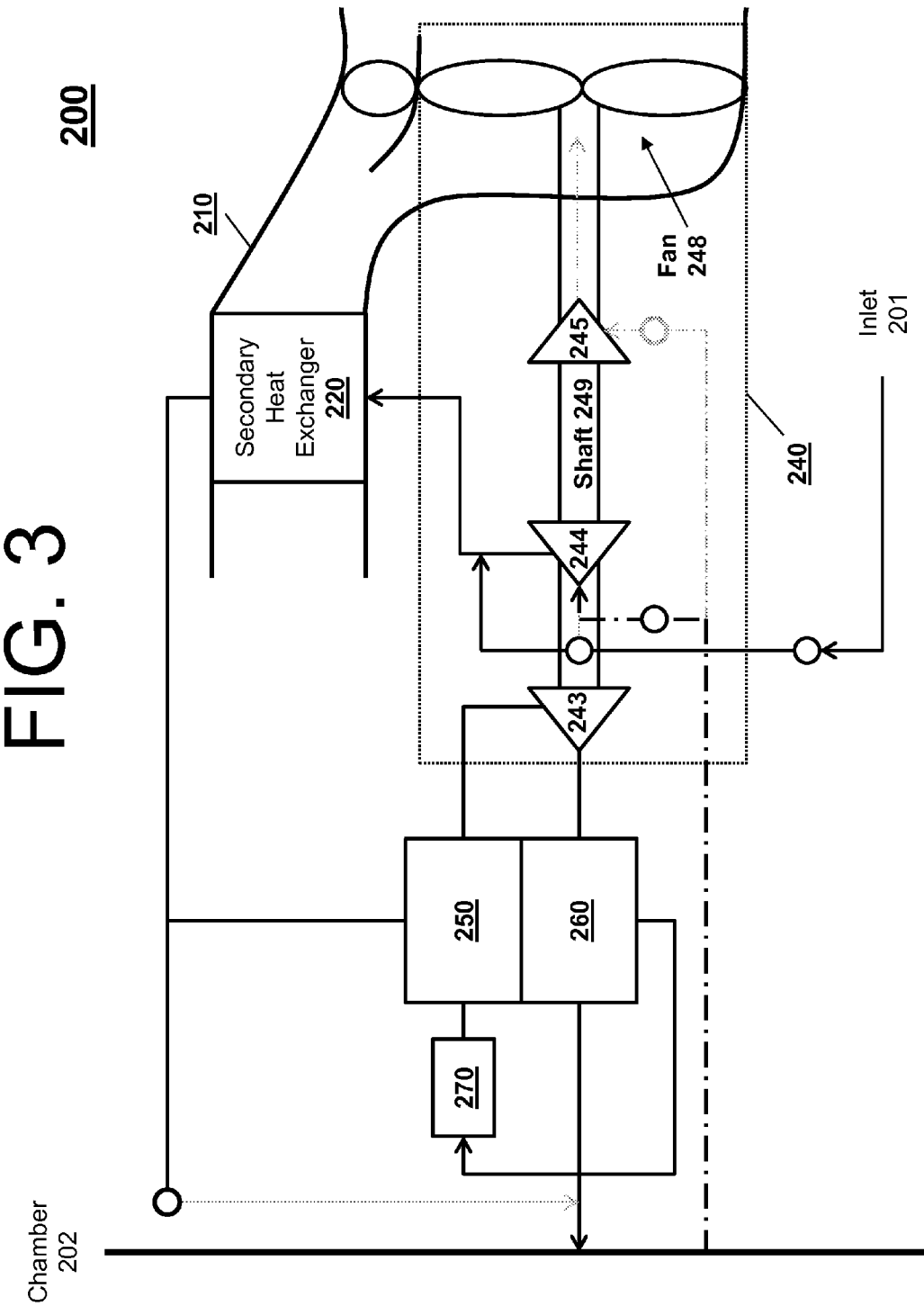
FIG. 3 depicts a high pressure mode schematic of a system aircraft according to an embodiment.

FIG. 3 depicts a schematic of a system 200 operating in the high pressure mode (e.g., an operational embodiment of the system 200 of FIG. 2). The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of air from a source (e.g., an engine and/or the APU) is adequate to drive a cycle of the system 200 or when a chamber 202 temperature demands it. For example, conditions such as ground idle, taxi, take-off, climb, descent, hold, and like conditions would have the air cycle machine 240 operating in a high pressure mode. Further, extreme temperature high altitude cruise conditions could result in one or of the more air cycle machines 240 operating in this mode, and/or two or more air cycle machines 240 per system operating in different modes. For instance, when the ambient temperature is hot (e.g., above a nominal day by 6 to 10 degrees or more standard atmosphere temperature), one or more of the one or more air cycle machines 240 will be in that mode.

In operation, recirculated air flows from the chamber 202 and enters the compressor 244. The compressor 244 further pressurizes the recirculated air and in the process heats it. Further, bleed air, such as high-pressure high-temperature air, from a source (e.g., an engine and/or the APU) flows from the inlet 201 and, downstream of the compressor 244, mixes with pressurized and heated recirculated air. In this way, the bleed air from the source via the inlet 201 bypasses the air cycle machine 240 entirely. The mixed air then enters the secondary heat exchanger 220 and is cooled by ram air of the shell 210 to approximately an ambient temperature. Due to this mixing, a pressure of the recirculated air discharging from the compressor 244 is managed by the compressor 244 to match or closely match a pressure of the bleed air. This cool high pressure mixed air exits the secondary heat exchanger 220 and enters the high pressure water separator.

Note that in conventional aircraft systems, air being supplied to a cabin is produced from a process performed by a mix chamber. The mix chamber mixes bleed air from a pack (e.g., an air cycle machine), which is at a first temperature, and recirculated air from the cabin, which is at a second temperature, to max 50 degree air to provide to the cabin with conditioned air. In contrast, the operational embodiment of the high pressure mode conditions the recirculated air and the bleed air from the source together inside the air cycle machine 240 to produce the cool high pressure mixed air, thereby eliminating the need for the mix chamber.

In the high pressure water separator, the cool high pressure mixed air goes through the reheater 250, where it is cooled; the condenser 260, where it is cooled by air from the turbine 243 the air cycle machine 240; a water extractor 270, where the moisture in the air is removed; and the reheater 250, where the air is heated back to nearly the same temperature it started at when it entered the high pressure water separator. The warm high pressure and now dry air enters the turbine 243, where it is expanded so that work can be extracted. The work from the turbine 243 can drives both the before mentioned compressor 244 and a fan 248 that can be used to pull ram air flow through the shell 210 and across the secondary heat exchanger 220. After leaving the turbine 243, the air is cold, such as below freezing. This cold air is utilized to cool the warm moist air in the condenser 260 before being sent to the chamber 202 (e.g., to condition a cabin and a flight deck of the aircraft).

Note that, in extreme temperature high altitude cruise conditions (e.g., when the aircraft is at cruise, such as above 30,000 or 40,000 feet), the cool high pressure mixed air may upon exiting the secondary heat exchanger 220 bypass the high pressure water separator and directly enter the chamber 202. In this case, the recirculated air from the chamber may be utilized to drive the turbine 245 and prevent the air cycle machine 240 from freewheeling (i.e., turning below a minimum speed, such as 3,000, 3,500, 4,000, 4,500, 5,000, 5,500, 6,000, etc. revolutions per minute). That is, the recirculated air is taken from the chamber 202, expanded across the turbine 245, and dumped into the shell 210 based on a pressure ratio between ambient air of the shell 210 and the recirculated air.

Figure 4:
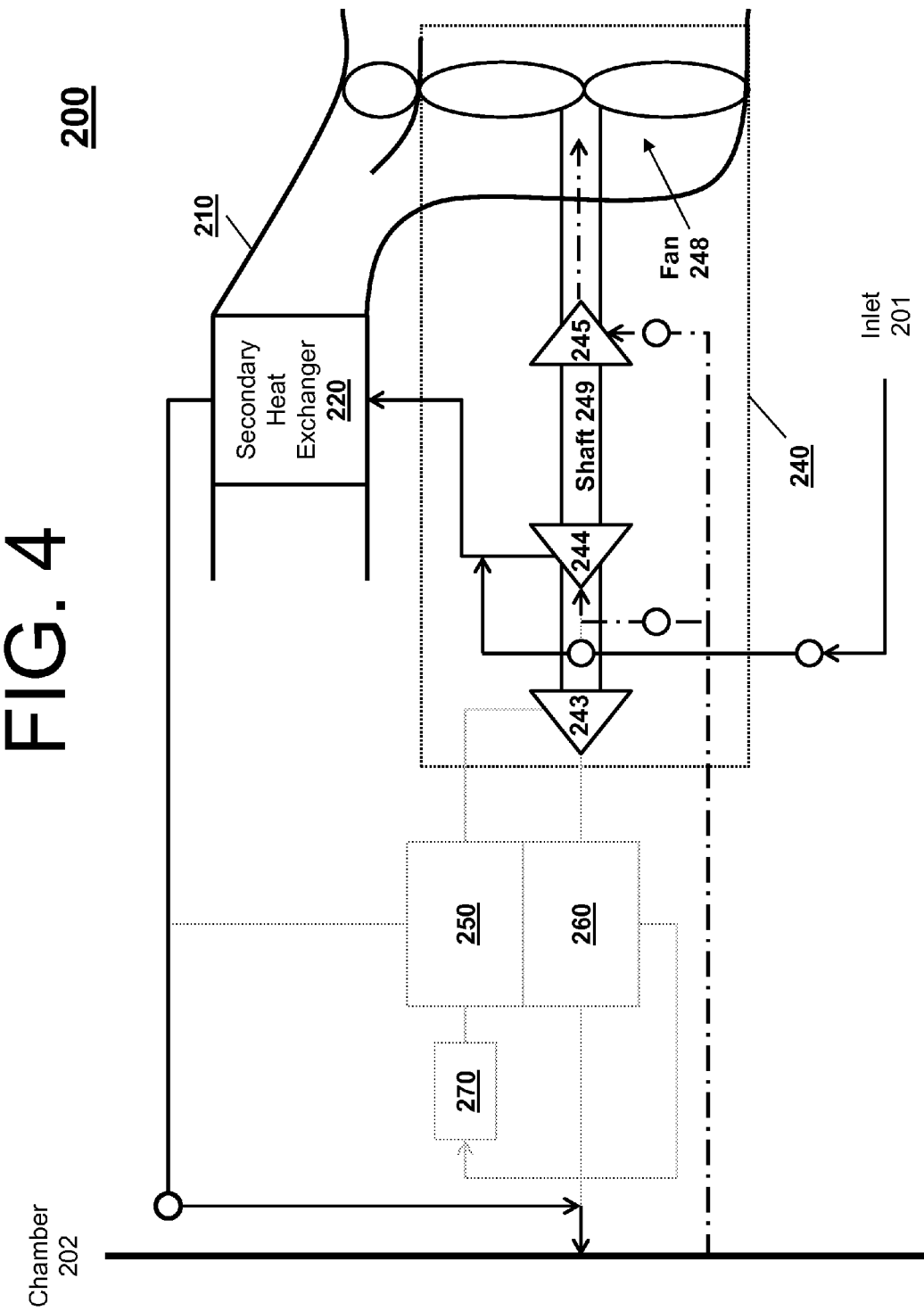
FIG. 4 depicts a recirculation chilling mode schematic of a system aircraft according to an embodiment.

FIG. 4 depicts a schematic of a system 200 operating in the recirculation chilling mode (e.g., an operational embodiment of the system 200 of FIG. 2). The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of air from a source (e.g., an engine and/or the APU) is adequate to drive a cycle of the system 200 or when a chamber 202 temperature demands it. This mode of operation would be used at flight conditions where a pressure of the air from a source (e.g., an engine and/or the APU) enters the air cycle machine 240 at or approximately at 1 to 3 psi or above a pressure of the chamber 202. For example, the mode may be utilized in such conditions as when the aircraft is at cruise (e.g., at altitudes above 30,000 or 40,000 feet) and at or near standard ambient day types.

In operation, recirculated air flows from the chamber 202 and enters the compressor 244. The compressor 244 further pressurizes the recirculated air and in the process heats it. Further, bleed air, such as high-pressure high-temperature air, from a source (e.g., an engine and/or the APU) flows from the inlet 201 and, downstream of the compressor 244, mixes with pressurized and heated recirculated air. In this way, the bleed air from the source via the inlet 201 bypasses the air cycle machine 240 entirely. The mixed air then enters the secondary heat exchanger 220 and is cooled by ram air of the shell 210 to approximately an ambient temperature. Due to this mixing, a pressure of the recirculated air discharging from the compressor 244 is managed by the compressor 244 to match or closely match a pressure of the bleed air. This cool high pressure mixed air exits the secondary heat exchanger 220, bypasses the high pressure water separator, and enters the chamber 202. In the case, recirculated air is used to keep the air cycle machine 240 turning at or above the minimum speed (e.g., above a windmilling speed) using recirculated air to drive turbine 245. That is, the air cycle machine 240 may need to remain turning so as to prevent windmilling. Thus, in one example, the recirculated air is used to keep the air cycle machine 240 turning at or above the minimum speed via the use of a regulated valve. Said minimum speed being at least 5000 RPM, more preferable 15,000 RPM, still more preferably 30,000 RPM. Other examples of mechanism that prevent windmilling include an electric fan, a break, a fan bypass, etc.

Figure 5:
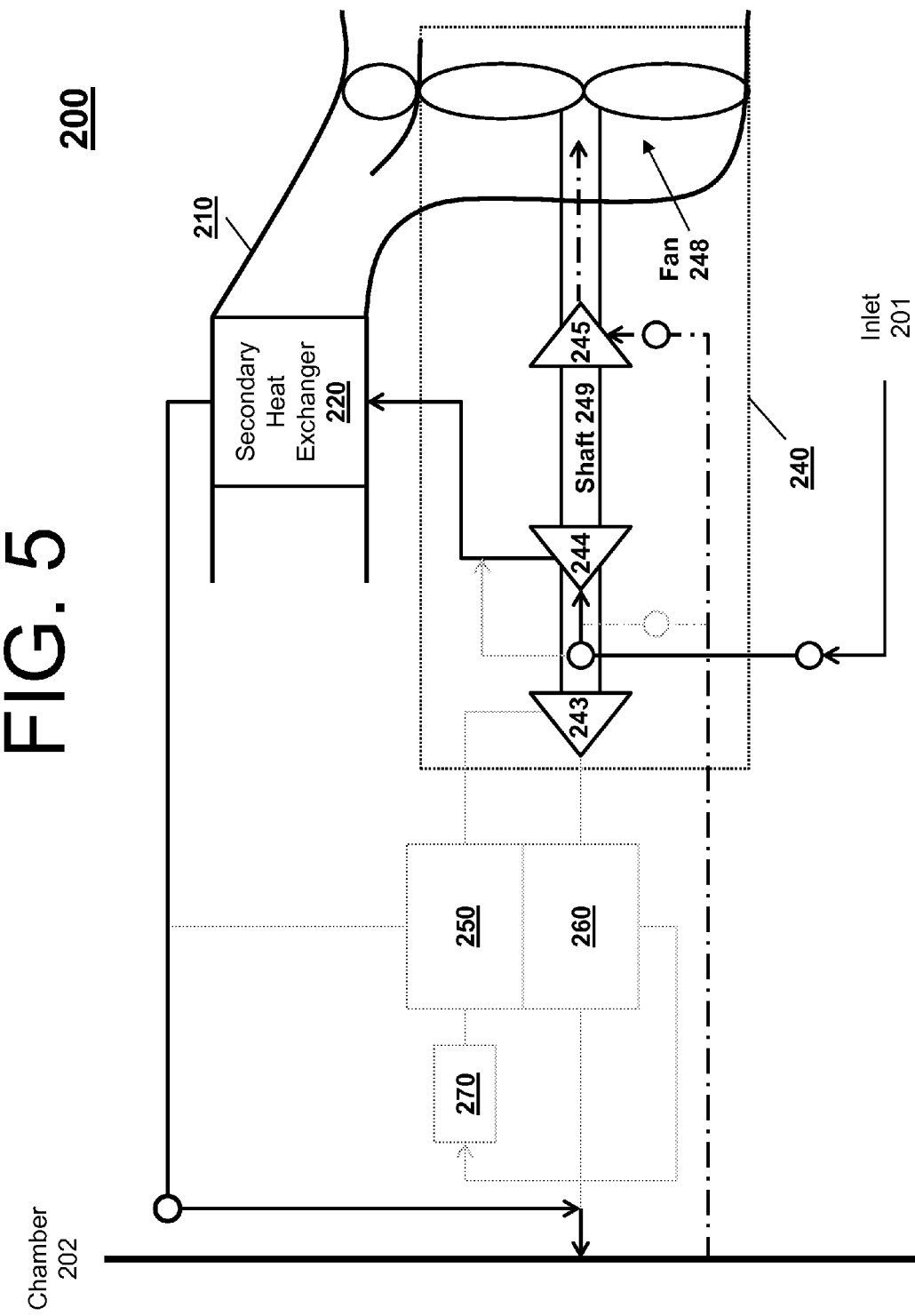
FIG. 5 depicts a boost pressure mode schematic of a system aircraft according to an embodiment.

FIG. 5 depicts a schematic of a system 200 operating in the pressure boost mode (e.g., another operational embodiment of the system 200 of FIG. 2). The flow of bleed air is illustrated as solid arrows flowing through the system 200 from inlet 201 to chamber 202. The flow of recirculated air is illustrated as dot-dashed arrows flowing from the chamber 202 through the system 200. This mode of operation can be used at flight conditions when a pressure of the air from the source and entering the air cycle machine 240 is lower than a pressure of the chamber 202 (e.g., at or below 1, 1.5, 2, 2.5, 3, 3.5, etc. pounds per square inch). For example, the mode may be utilized in such conditions as when the aircraft is at cruise (e.g., at altitudes above 30,000 or 40,000 feet) and at or near standard ambient day types.

In operation, the air from the source enters the compressor 244 and is compressed and heated. This pressurized warm air then enters the secondary heat exchanger 220 and is cooled by ram air of the shell 210 to a temperature desired for the chamber 202. The air then goes directly into the chamber 202.

Further, the recirculated air is used to provide energy to pressurize the bleed air. That is, the recirculated air enters and expands across the turbine 245, so that and work is extracted. This work is enough to turn the air cycle machine 240 at a speed required by the compressor 244 to raise a pressure of the bleed air from the source via inlet 201 to a pressure that enables the bleed air to get through the secondary heat exchanger 220 and into the chamber 202. Note that the recirculated air exiting the turbine 245 is then dumped overboard through the shell 210.

The technical effects and benefits of embodiments of the present invention include providing an air cycle machine that is as efficient in the pressure boost mode and the high pressure mode. For example, in the embodiments described above, a compressor in the high pressure mode that can have an input pressure of 14.7 psi, while in the pressure boost mode the compressor inlet pressure can be 8.5 psia. In turn, choosing a compressor flow in the high pressure mode, the compressor range can be narrowed to align the compressor operating points and achieve better efficiency in the pressure boosting mode.

Aspects of the present invention are described herein with reference to flowchart illustrations, schematics, and/or block diagrams of methods, apparatus, and/or systems according to embodiments of the invention. Further, the descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. An environmental control system, comprising:
    an air cycle machine comprising a compressor and a turbine,
    wherein the compressor includes a compressor outlet that is matched to a bleed air source:
    at least one heat exchanger;
    wherein recirculated air that flows directly into the compressor,
    wherein the recirculated air discharged from the compressor outlet is at a same pressure as bleed air supplied by the bleed air source,
    wherein the recirculated air discharged from the compressor outlet is combined with the bleed air supplied by the bleed air source to produce mixed air,
    wherein a flow of the mixed air is provided to the at least one heat exchanger;
    wherein the environmental control system is configured to, during a recirculation chilling mode, cause the flow of the bleed air to bypass the compressor and provide portions of the flow of the recirculated air directly to the turbine and the compressor.

2. The environmental control system of claim 1, further comprises:
    the air cycle machine comprising a second turbine,
    a high pressure water separator configured to condition the mixed air before the mixed air is passed to the chamber,
    wherein the second turbine is configured to receive the mixed air from the high pressure water separator,
    wherein as the mixed air expands across the second turbine, work is extracted by the air cycle machine to compress the recirculated air via the compressor.

3. The environmental control system of claim 1,
    wherein as a first portion of the recirculated air expands across the turbine, work is extracted by the air cycle machine to compress a second portion of the recirculated air via the compressor,
    wherein the second portion of the recirculated air discharged from the compressor outlet is combined with the bleed air supplied by the bleed air source to produce mixed air.

4. The environmental control system of claim 3, wherein the first portion of the flow of the recirculated air expands across the turbine based on an energy ratio to turn a shaft of the air cycle machine.

5. The environmental control system of claim 4, wherein the shaft of the air cycle machine rotates at a minimum speed.

6. The environmental control system of claim 1, further comprising:
    a first flow valve configured to divert the flow of the bleed air from bypassing the compressor or to directly entering the compressor; and
    a second flow valve configured to provide the flow of the recirculated air directly into the turbine.

7. The environmental control system of claim 1, wherein the recirculated air expands across the turbine based on an energy ratio to turn a shaft of the air cycle machine.

8. The environmental control system of claim 1,
    wherein when a first portion of the recirculated air expands across the turbine, work is extracted by an air cycle machine of the environmental control system to compress a second portion of the recirculated air via the compressor.

9. The environmental control system of claim 1, configured to operate in a boost mode,
    wherein when the recirculated air expands across a turbine, work is extracted by an air cycle machine of the environmental control system to compress the bleed air via the compressor.

10. The environmental control system of claim 1, configured to operate in a low pressure mode,
    wherein the recirculated air expands across a turbine to turn the air cycle machine at a minimum speed greater than a windmilling speed.

11. The environmental control system of claim 1, wherein the environmental control system is included within an aircraft.

* * * * *